United States Patent
Lee

(10) Patent No.: US 7,831,284 B2
(45) Date of Patent: Nov. 9, 2010

(54) METHOD AND DEVICE FOR PREVENTING UNINTENTIONAL KEY INPUT IN A WIRELESS MOBILE TERMINAL WITH A REMOVABLE CASE

(75) Inventor: Sung-Yeon Lee, Gumi-si (KR)

(73) Assignee: Samsung Electronics Corp., Ltd., Suwon-si (KR)

( * ) Notice: Subject to any disclaimer, the term of this patent is extended or adjusted under 35 U.S.C. 154(b) by 972 days.

(21) Appl. No.: 11/652,479

(22) Filed: Jan. 12, 2007

(65) Prior Publication Data
US 2008/0073192 A1 Mar. 27, 2008

(30) Foreign Application Priority Data
Sep. 26, 2006 (KR) .................. 10-2006-0093509

(51) Int. Cl.
*H01H 13/04* (2006.01)
(52) U.S. Cl. .................. 455/575.1; 455/90.1
(58) Field of Classification Search ............ 455/90.1, 455/90.3, 550.1, 566, 575.1, 575.8
See application file for complete search history.

(56) References Cited

U.S. PATENT DOCUMENTS

2004/0092247 A1* 5/2004 Tani .................. 455/410
2006/0022822 A1* 2/2006 Wong et al. .......... 340/568.1

FOREIGN PATENT DOCUMENTS

| CN | 1498002 A | 5/2004 |
|---|---|---|
| EP | 1 411 709 | 4/2004 |
| GB | 2 382 953 | 6/2003 |
| GB | 2 424 339 | 9/2006 |
| KR | 10-2006-0027563 | 3/2006 |

* cited by examiner

*Primary Examiner*—Sam Bhattacharya
(74) *Attorney, Agent, or Firm*—Roylance, Abrams, Berdo & Goodman, L.L.P.

(57) ABSTRACT

A device for preventing an unintentional key input in a mobile terminal with a removable outer case is provided. The device includes a connection section to which the outer case is connected, a sensing unit for sensing whether the outer case is opened or closed, and a control unit for sensing whether the outer case is connected to the mobile terminal through the connection section. The control unit activates a key input unit of the mobile terminal when the sensing unit senses that the outer case is opened.

16 Claims, 4 Drawing Sheets

METHOD AND DEVICE FOR PREVENTING UNINTENTIONAL KEY INPUT IN A WIRELESS MOBILE TERMINAL WITH A REMOVABLE CASE

CROSS-REFERENCE TO RELATED APPLICATION

This application claims the benefit under 35 U.S.C. §119(a) of an application entitled "Method And Device For Preventing Unintentional Key Input In A Wireless Mobile Terminal With A Removable Case" filed in the Korean Industrial Property Office on Sep. 26, 2006 and assigned Serial No. 2006-93509, the entire contents of which are hereby incorporated by reference.

BACKGROUND OF THE INVENTION

1. Field of the Invention

The present invention relates to a mobile terminal. More particularly, the present invention relates to a method and a device for preventing an unintentional key input in a mobile terminal with a removable case.

2. Description of the Related Art

In general, a mobile terminal is a portable communication device which provides voice and data communication services. In a modern person's daily life, a mobile terminal has become a necessity. Recently, as mobile terminals have become more and more widely used and have implemented various additional functions, the convenience to users has increased. However, the greater the number of functions implemented by a mobile terminal increases, the more the size of the mobile terminal tends to increase. To address this, slim mobile terminals having a minimal size and depth have recently been gaining popularity among users. Due to the slim configuration, the mobile terminals typically require an outer protective case. Usually, the outer case is a non-metallic material that maintains the outer appearance of the mobile terminal and prevents unintentional key inputs. To address unintentional key inputs when the mobile terminal is removed from the outer case, conventional mobile terminals include a hold key. The hold key activates a hold state that prevents unintentional key input. The hold key also deactivates the hold state so that a user may make key inputs. Although this type of mobile terminal provides a method of preventing unintentional key input, it requires a user to manipulate a hold key whenever the user wants to use the mobile terminal. This causes inconvenience to users.

Accordingly, there is a need for an improved method and device for preventing unintentional key inputs in a mobile terminal.

SUMMARY OF THE INVENTION

An aspect of the present invention is to address at least the above problems and/or disadvantages and to provide at least the advantages described below. Accordingly, an aspect of the present invention is to provide a method and a device that prevents unintentional key inputs in a mobile terminal with a removable outer case and improves a user's convenience.

In accordance with an aspect of the present invention, a device for preventing an unintentional key input in a mobile terminal with a removable outer case is provided. The device includes a connection section to which the outer case is connected, a sensing unit for sensing opening and closing of the outer case, and a control unit for sensing connection of the outer case to the mobile terminal through the connection section, and activating a key input unit of the mobile terminal when opening of the outer case is sensed through the sensing unit.

In accordance with another aspect of the present invention, a method for preventing an unintentional key input in a mobile terminal with a removable outer case is provided. The method includes the steps of determining whether the outer case is connected to the mobile terminal, sensing whether the outer case is opened or closed when it is determined that the outer case is connected to the mobile terminal, and activating a key input unit of the mobile terminal when the outer case is opened.

In accordance with another aspect of the present invention, a mobile terminal is provided. The mobile terminal includes a body, a key input unit for receiving key inputs disposed on the body, a sensor for detecting whether the outer case is in the opened or closed position, an outer case that is attachable to and detachable from the body, the outer case being movable between opened and closed positions and a control unit for detecting whether the outer case is connected to the mobile terminal and for detecting whether the outer case is an opened or closed position, wherein the control unit activates the key input unit when the control unit detects that the outer case is attached to the body and that the outer case is opened through the sensor.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, specific exemplary embodiments of the present invention will be described with reference to the accompanying drawings.

Figure 1:
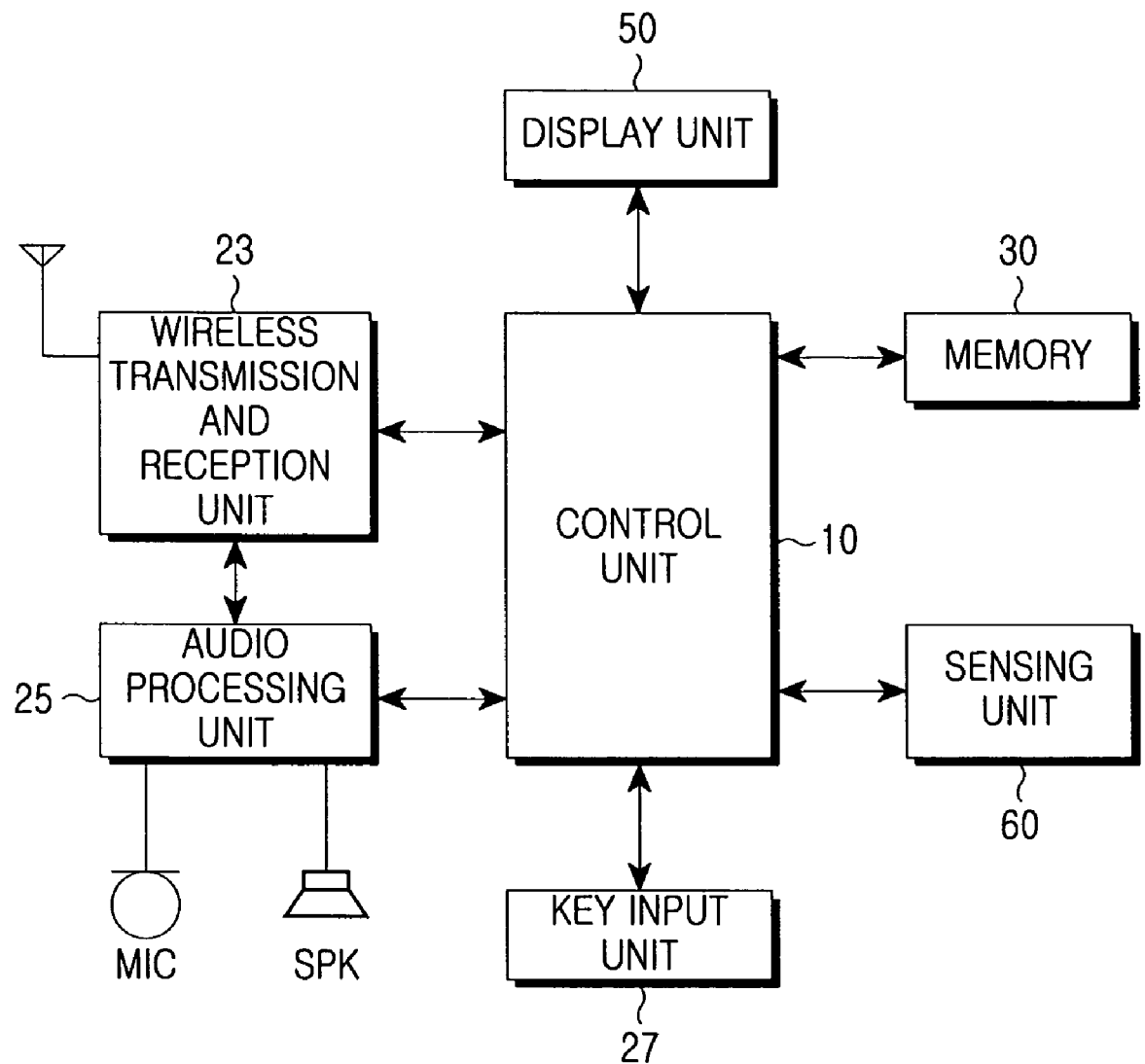
FIG. 1 is a block diagram of a mobile terminal in accordance with an exemplary embodiment of the present invention.

FIG. 1 is a block diagram of a mobile terminal in accordance with an exemplary embodiment of the present invention.

Referring to FIG. 1, a wireless transmission and reception unit 23 includes an RF part and a modem. The RF part includes an RF transmitter for up-converting and amplifying the frequency of a signal to be transmitted, and an RF receiver for low-noise amplifying a received signal and down-converting the frequency of the received signal. The modem includes a transmitter for encoding and modulating a signal to be transmitted, and a receiver for demodulating and decoding the signal received from the RF part.

An audio processing unit 25 may include a codec. The codec includes a data codec and an audio codec. The data codec processes packet data and the like and the audio codec processes audio signals such as voice, multimedia files, and so forth. The audio processing unit 25 converts a digital audio signal received from the modem into an analog signal through the audio codec and reproduces the analog signal through a speaker SPK, or converts an analog audio signal produced from a microphone MIC into a digital audio signal through the audio codec and transmits the digital audio signal to the modem. The codec may be separately provided or be included in a control unit 10.

A key input unit 27 has keys for inputting numerical and character information and function keys for activating various functions. In the exemplary embodiment of the present invention, the key input unit 27 may include a hold key (not shown) which deactivates other keys when it is pressed and activates other keys when it is not pressed.

A memory 30 may include a program memory and a data memory. Programs for controlling the general operation of the mobile terminal are stored in the program memory.

A display unit 50 may include an LCD (liquid crystal display) or an OLED (organic light emitting diode) display. The display unit 50 outputs various display information generated in the mobile terminal. In the exemplary embodiment of the present invention, the display unit 50 includes a touch screen which constitutes an input unit of the mobile terminal in cooperation with the key input unit 27.

A sensing unit 60 senses the opening and closing of an outer case which is connected to the mobile terminal. In the exemplary embodiment of the present invention, the sensing unit 60 is a Hall effect sensor.

A connection section 70 serves as a port through which the outer case is connected to the mobile terminal.

The control unit 10 converts and controls the operation of the mobile terminal. In the exemplary embodiment of the present invention, the control unit 10 activates the key input unit 27 only when the sensing unit 60 senses that the outer case is opened after the outer case is connected to the mobile terminal through the connection section 70. That is to say, the control unit 10 only recognizes as an effective key input a key input which is generated while the outer case is opened, and implements a corresponding operation. At this time, if the outer case is not connected to the mobile terminal, the control unit 10 according to the exemplary embodiment of the present invention performs a control task in conformity with the state of the hold key rather than the sensing result from the sensing unit 60. Accordingly, when the outer case is disconnected from the mobile terminal, the control unit 10 prevents the generation of a key input when the hold key is pressed to activate a hold state, and implements an operation which corresponds to a key input when the hold key is not pressed and a hold state is deactivated.

Figure 2:
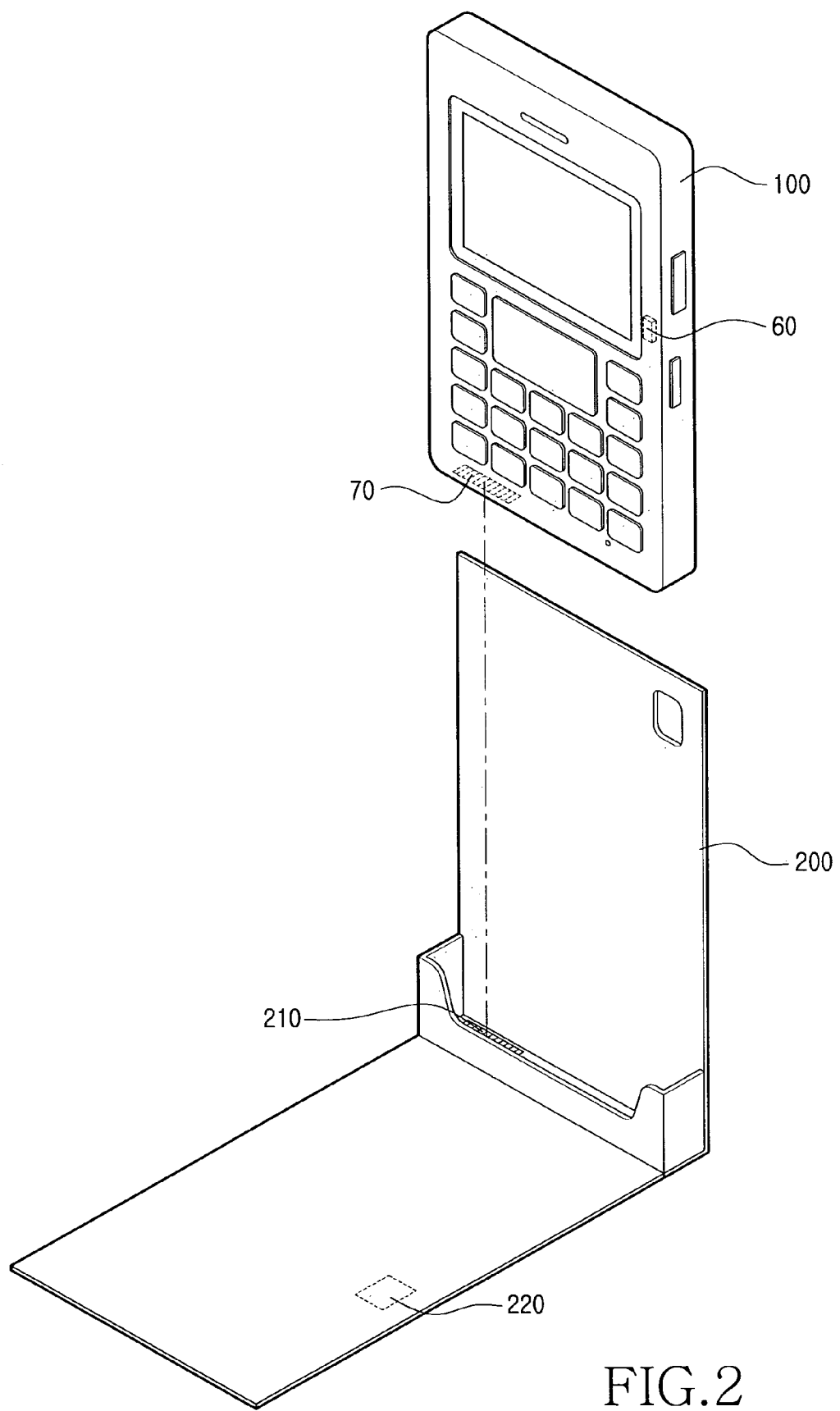
FIG. 2 is an exploded perspective view of the mobile terminal and an outer case in accordance with the exemplary embodiment of the present invention.
Figure 3:
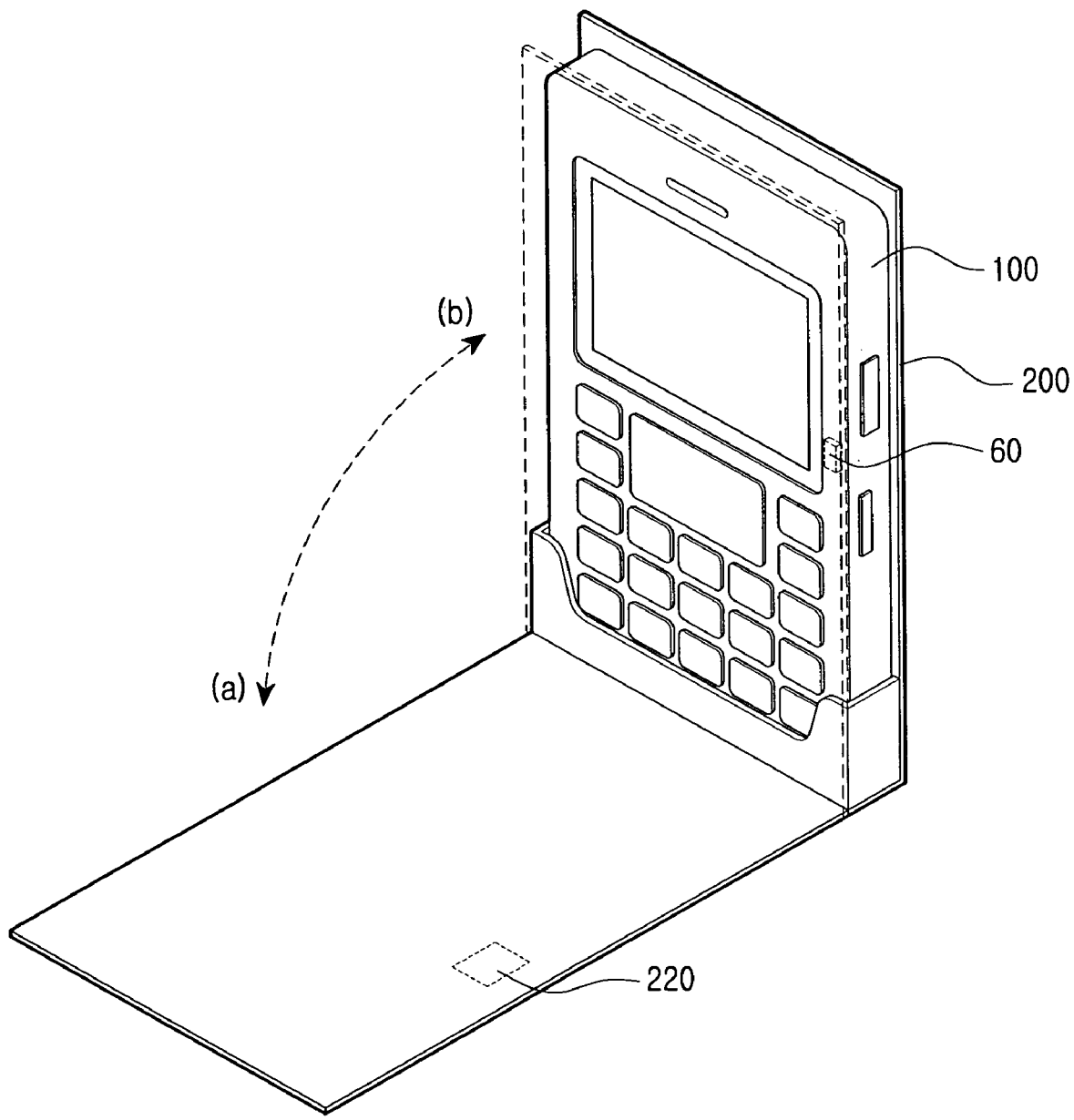
FIG. 3 is an assembled perspective view of the mobile terminal and the outer case in accordance with the exemplary embodiment of the present invention.

FIG. 2 is an exploded perspective view of the mobile terminal and an outer case in accordance with the embodiment of the present invention, and FIG. 3 is an assembled perspective view of the mobile terminal and the outer case in accordance with the embodiment of the present invention.

Referring to FIG. 2, the outer case 200 can be attached to and detached from the mobile terminal 100 through a fixing arrangement (not shown). If the connection section 210 of the outer case 200 is connected to the connection section 70 of the mobile terminal 100, the control unit 10 determines that the outer case 200 is connected to the mobile terminal 100. The sensing unit 60 is located at an appropriate position on the mobile terminal 100. When the sensing unit 60 includes a Hall effect sensor, the outer case 200 has a magnet 220 at a position corresponding to the Hall effect sensor.

FIG. 3 illustrates the mobile terminal 100 and the outer case 200 assembled with each other. The outer case 200 is opened (for example, toward a position (a)) when using the mobile terminal 100 and closed (for example, toward a position (b)) when not using the mobile terminal 100.

Figure 4:
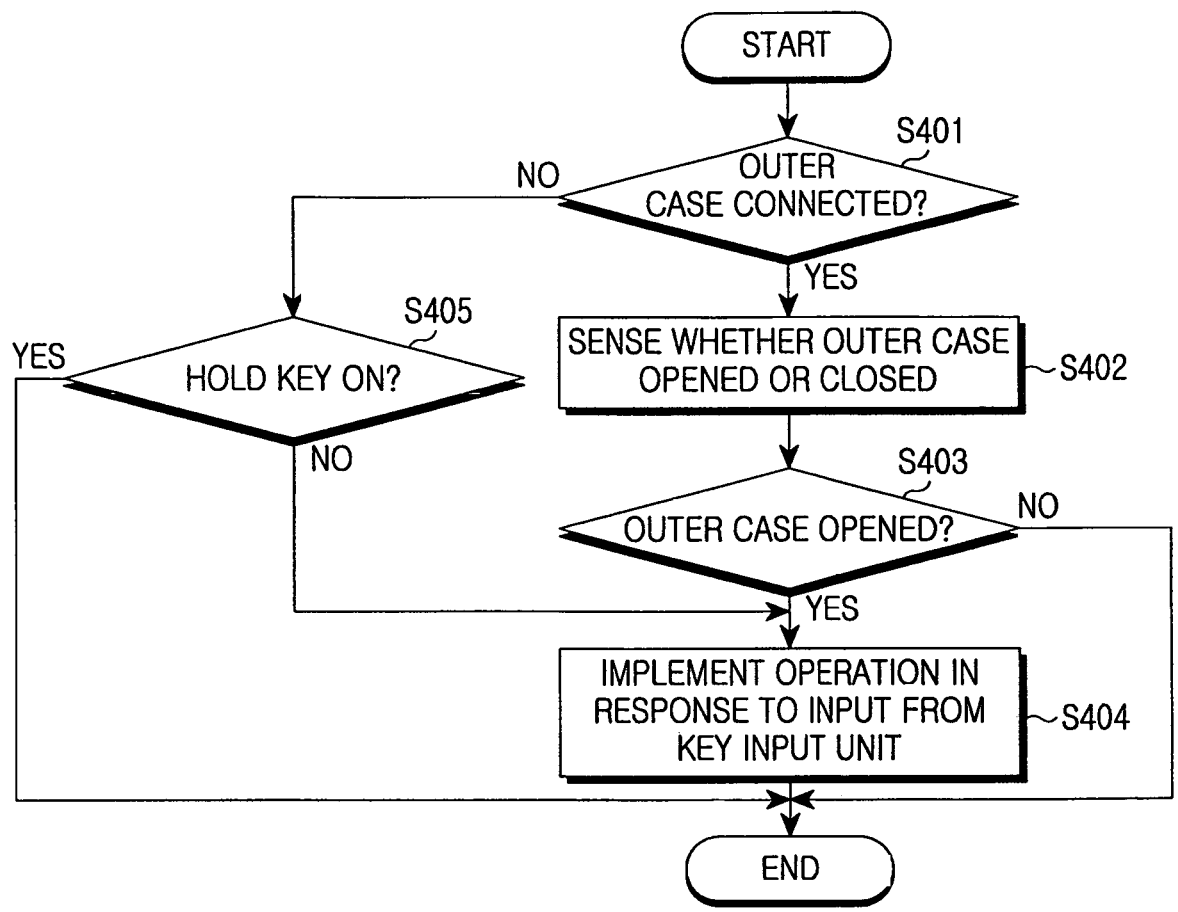
FIG. 4 is a flow chart of a method for preventing an unintentional key input in the mobile terminal in accordance with the exemplary embodiment of the present invention.

FIG. 4 is a flow chart of a method for preventing an unintentional key input in the mobile terminal in accordance with the exemplary embodiment of the present invention. The method for preventing an unintentional key input will be described with reference to FIGS. 2 through 4.

When it is sensed that the outer case is connected to the mobile terminal (S401), the control unit 10 senses whether the outer case is opened or closed (S402).

If the mobile terminal 100 and the outer case 200 are connected to each other as shown in FIG. 3, the connection section 70 and the connection section 210 as shown in FIG. 2 are connected with each other. Accordingly, when the control unit 10 senses the connection between the connection section 70 and the connection section 210, it determines that the outer case 200 is connected to the mobile terminal 100. When it is determined that the outer case 200 is connected to the mobile terminal 100, the control unit 10 senses whether the outer case 200 is opened or closed with the sensing unit 60.

When it is sensed that the outer case is opened (S403), the control unit 10 implements an operation which corresponds to a generated key input (S404).

If the sensing unit 60 is a Hall effect sensor, as the outer case 200 is moved toward the open position (a) or the closed position (b) of FIG. 3, a magnetic field around the Hall effect sensor is changed under the influence of the magnet 220. The control unit 10 senses whether the outer case 200 is opened or closed based on the magnetic field around the Hall effect sensor. If the outer case 200 is closed, the control unit 10 deactivates the key input unit 27 and does not implement a corresponding operation even when a key is pressed. In contrast, if the outer case 200 is opened, the control unit 10 activates the key input unit 27 and implements an operation which corresponds to a key input from the activated key input unit 27.

If it is sensed from step S401 that the outer case is disconnected from the mobile terminal, the control unit 10 checks the hold key configuration (S405).

If the mobile terminal is used without the outer case 200, the control unit 10 activates or deactivates the key input unit 27 in conformity with the on- or off-state of the hold key configuration rather than the sensing result from the sensing unit 60. Hence, the control unit 10 neglects a key input when the hold key activates a hold state, and the control unit 10 implements an operation which corresponds to a key input when the hold key deactivates a hold state.

As is apparent from the above description, the method and the device for preventing an unintentional key input in a mobile terminal with a removable outer case according to the present invention provide advantages in that an unintentional key input prevention function can be quickly established and released by opening and closing the outer case without the need to manipulate a separate key.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A device for preventing an unintentional key input in a mobile terminal with a removable outer case, the device comprising:
   a connection section for connection to the outer case;
   a sensing unit for sensing whether the outer case is opened or closed; and
   a control unit for sensing whether the outer case is connected to the mobile terminal through the connection section and activating a key input unit of the mobile terminal when the sensing unit senses that the outer case is opened.

2. The device as set forth in claim 1, wherein the sensing unit comprises a Hall effect sensor.

3. The device as set forth in claim 2, wherein the outer case comprises a magnet for allowing the sensing unit to sense whether the outer case is opened or closed.

4. The device as set forth in claim 1, wherein the control unit implements an operation which corresponds to a key input from the activated key input unit.

5. The device as set forth in claim 1, wherein, when the outer case is disconnected from the connection section of the mobile terminal, the control unit activates or deactivates the key input unit in response to manipulation of a hold key of the mobile terminal.

6. The device as set forth in claim 5, wherein the control unit implements an operation which corresponds to a key input from the key input unit when the key input is activated by a hold key of the mobile terminal.

7. The device as set forth in claim 1, wherein, when the outer case is connected to the mobile terminal and the outer case is closed, the control unit deactivates the key input unit of the mobile terminal.

8. A method for preventing an unintentional key input in a mobile terminal with a removable outer case, the method comprising :
   determining whether the outer case is connected to the mobile terminal;
   sensing whether the outer case is opened or closed when it is determined that the outer case is connected to the mobile terminal; and
   activating a key input unit of the mobile terminal when the outer case is opened.

9. The method as set forth in claim 8, further comprises implementing an operation which corresponds to a key input from the activated key input unit.

10. The method as set forth in claim 8, further comprises activating or deactivating the key input unit in response to manipulation of a key of the mobile terminal when it is determined that the outer case is not connected to the mobile terminal.

11. The method as set forth in claim 10, further comprises implementing an operation which corresponds to a key input from the key input unit activated through the manipulation of a hold key.

12. The method as set forth in claim 8, further comprises deactivating the key input unit of the mobile terminal when the outer case is closed.

13. A mobile terminal comprising:
   a body;
   a key input unit for receiving key inputs disposed on the body;
   a sensor for detecting whether the outer case is in the opened or closed position;
   an outer case that is attachable to and detachable from the body, the outer case being movable between opened and closed positions; and
   a control unit for detecting whether the outer case is connected to the mobile terminal and for detecting whether the outer case is an opened or closed position,
   wherein the control unit activates the key input unit when the control unit detects that the outer case is attached to the body and that the outer case is opened through the sensor.

14. A mobile terminal as set forth in claim 13, further comprising:
   a first connection section disposed on the body; and
   a second connection section disposed on the outer case, the second connection section being connected to the first connection section when the outer case is attached to the body,
   wherein the control unit detects whether the outer case is attached to the body through the connection section.

15. A mobile terminal as set forth in claim 13, wherein the sensor comprises a Hall effect sensor.

16. The mobile terminal as set forth in claim 13, further comprising a hold key, wherein when the outer case is detached from the mobile terminal, the control unit activates or deactivates the key input unit in response to manipulation of the hold key.

* * * * *

UNITED STATES PATENT AND TRADEMARK OFFICE
CERTIFICATE OF CORRECTION

PATENT NO.          : 7,831,284 B2                                        Page 1 of 1
APPLICATION NO.     : 11/652479
DATED               : November 9, 2010
INVENTOR(S)         : Sung-Yeon Lee It is certified that error appears in the above-identified patent and that said Letters Patent is hereby corrected as shown below:

On the Title Page
    Change Item (73) "Samsung Electronics Corp., Ltd." to "Samsung Electronics Co., Ltd."

Signed and Sealed this

Fourth Day of January, 2011

David J. Kappos
*Director of the United States Patent and Trademark Office*